(12) United States Patent
Maeda

(10) Patent No.: US 11,796,029 B2
(45) Date of Patent: Oct. 24, 2023

(54) SHOCK ABSORBER AND METHOD OF MANUFACTURING THE SAME

(71) Applicant: Hitachi Automotive Systems, Ltd., Ibaraki (JP)

(72) Inventor: Atsushi Maeda, Fujisawa (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 16/630,890

(22) PCT Filed: Jul. 9, 2018

(86) PCT No.: PCT/JP2018/025874
§ 371 (c)(1),
(2) Date: Jan. 14, 2020

(87) PCT Pub. No.: WO2019/021797
PCT Pub. Date: Jan. 31, 2019

(65) Prior Publication Data
US 2020/0149608 A1 May 14, 2020

(30) Foreign Application Priority Data
Jul. 26, 2017 (JP) .................... 2017-144245

(51) Int. Cl.
*F16F 9/512* (2006.01)
*F16F 9/18* (2006.01)
(Continued)

(52) U.S. Cl.
CPC ............. *F16F 9/512* (2013.01); *F16F 9/182* (2013.01); *F16F 9/19* (2013.01); *F16F 9/3214* (2013.01);
(Continued)

(58) Field of Classification Search
CPC .... F16F 9/512; F16F 9/182; F16F 9/19; F16F 9/3214; F16F 9/3228; F16F 9/3271;
(Continued)

(56) References Cited

U.S. PATENT DOCUMENTS 3,540,683 A * 11/1970 Foster ................... B64C 25/60
244/104 R
3,846,379 A 11/1974 Schneider et al.
(Continued)

FOREIGN PATENT DOCUMENTS

CN  102734373 A  10/2012
CN  102808885 A  12/2012
(Continued)

OTHER PUBLICATIONS

Japanese Office Action received in corresponding Japanese Application No. 2019-532483 dated Mar. 2, 2021.
(Continued)

*Primary Examiner* — Xuan Lan Nguyen
(74) *Attorney, Agent, or Firm* — Mattingly & Malur, PC

(57) ABSTRACT

A shock absorber includes: a first passage through which a working fluid flows from a chamber inside a cylinder; a second passage which communicates with the chamber; a damping force generation mechanism which is provided in the first passage, a communication hole which is provided with at least a part of a passage of the second passage and is formed in a piston rod communicating with at least the chamber; a housing which has a passage of least a part of the second passage; a free piston which is movably provided inside the housing and defines the second passage into an upstream side and a downstream side of a flow of the working fluid when the piston moves in one direction, and
(Continued)

an elastic body which is provided between the free piston and the housing. The free piston is formed of a resin material.

5 Claims, 5 Drawing Sheets

(51) Int. Cl.
| | |
|---|---|
| *F16F 9/19* | (2006.01) |
| *F16F 9/32* | (2006.01) |
| *F16F 9/348* | (2006.01) |
| *F16F 9/516* | (2006.01) |
| *B60G 13/08* | (2006.01) |
| *B60G 17/08* | (2006.01) |
| *F16F 9/06* | (2006.01) |
| *F16F 9/36* | (2006.01) |
| *F16F 9/58* | (2006.01) |

(52) U.S. Cl.
CPC .......... *F16F 9/3221* (2013.01); *F16F 9/3228* (2013.01); *F16F 9/3271* (2013.01); *F16F 9/348* (2013.01); *F16F 9/516* (2013.01); *B60G 13/08* (2013.01); *B60G 17/08* (2013.01); *B60G 2202/24* (2013.01); *B60G 2204/129* (2013.01); *B60G 2206/41* (2013.01); *B60G 2206/73* (2013.01); *B60G 2206/80* (2013.01); *B60G 2500/112* (2013.01); *B60G 2800/162* (2013.01); *F16F 9/062* (2013.01); *F16F 9/064* (2013.01); *F16F 9/185* (2013.01); *F16F 9/3242* (2013.01); *F16F 9/362* (2013.01); *F16F 9/585* (2013.01); *F16F 2222/12* (2013.01); *F16F 2224/02* (2013.01); *F16F 2224/025* (2013.01); *F16F 2226/04* (2013.01); *F16F 2228/04* (2013.01); *F16F 2228/066* (2013.01); *F16F 2230/0005* (2013.01); *F16F 2234/02* (2013.01)

(58) Field of Classification Search
CPC .. F16F 9/348; F16F 9/516; F16F 9/064; F16F 9/185; F16F 9/362; F16F 2222/12; B60G 17/08; B60G 2500/112; B60G 2202/24; B60G 13/08
See application file for complete search history.

(56) References Cited

U.S. PATENT DOCUMENTS

| | | | | |
|---|---|---|---|---|
| 3,991,863 | A * | 11/1976 | Lee | F16F 9/44 |
| | | | | 188/289 |
| 4,418,897 | A * | 12/1983 | Hartel | F16F 13/22 |
| | | | | 188/280 |
| 6,220,409 | B1 * | 4/2001 | Deferme | F16F 9/3228 |
| | | | | 188/282.1 |
| 9,353,860 | B2 * | 5/2016 | Frey | F16J 1/005 |
| 2003/0015382 | A1 * | 1/2003 | Lun | F16F 9/49 |
| | | | | 188/280 |
| 2009/0132122 | A1 | 5/2009 | Kim et al. | |
| 2011/0214953 | A1 | 9/2011 | Maeda et al. | |
| 2011/0214955 | A1 | 9/2011 | Maeda et al. | |
| 2012/0248670 | A1 | 10/2012 | Yamashita et al. | |
| 2012/0312648 | A1 | 12/2012 | Yu et al. | |
| 2014/0048365 | A1 | 2/2014 | Kim | |
| 2014/0238796 | A1 | 8/2014 | Yamashita et al. | |

FOREIGN PATENT DOCUMENTS

| | | | |
|---|---|---|---|
| DE | 2033193 | A | 3/1972 |
| DE | 38 26 931 | A | 2/1990 |
| DE | 10 2012 011 622 | A1 | 12/2012 |
| DE | 10 2013 013 683 | A1 | 2/2014 |
| JP | 56-5840 | U | 1/1981 |
| JP | 4402449 | B2 | 1/2010 |
| JP | 2011-202801 | A | 10/2011 |
| JP | 2014-9754 | A | 1/2014 |
| JP | 2014-92181 | A | 5/2014 |
| JP | 5531134 | B2 | 6/2014 |
| JP | 2014-163512 | A | 9/2014 |
| JP | 2014-163517 | A | 9/2014 |
| JP | 2015-21602 | A | 2/2015 |
| JP | 5809801 | B2 | 11/2015 |
| KR | 10-2009-0107355 | A | 10/2009 |

OTHER PUBLICATIONS

Chinese Office Action received in corresponding Chinese Application No. 201880049572.5 dated Dec. 18, 2020.
Korean Office Action received in corresponding Korean Application No. 10-2020-7002101 dated Feb. 23, 2021.
International Search Report of PCT/JP2018/025874 dated Sep. 11, 2018.
Written Opinion of PCT/JP2018/025874 dated Sep. 11, 2018.
German Office Action received in corresponding German Application No. 11 2018 003 791.6 dated Oct. 7, 2021.
Korean Office Action received in corresponding Korean Application No. 10-2020-7002101 dated Aug. 9, 2021.

* cited by examiner

SHOCK ABSORBER AND METHOD OF MANUFACTURING THE SAME

TECHNICAL FIELD

The present invention relates to a shock absorber and a method of manufacturing the same.

Priority is claimed on Japanese Patent Application No. 2017-144245, filed in Japan on Jul. 26, 2017, the content of which is incorporated herein by reference.

BACKGROUND ART

Conventionally, there is known a shock absorber with a damping force changing mechanism that changes damping force characteristics in response to a vibration state (for example, see Patent Documents 1 and 2).

CITATION LIST

Patent Document

[Patent Document 1] Japanese Patent No. 5531134
[Patent Document 2] Japanese Patent No. 5809801

SUMMARY OF INVENTION

Technical Problem

In the shock absorber, it is required to suppress the generation of abnormal noise.

The present invention provides a shock absorber capable of suppressing the generation of abnormal noise and a method of manufacturing the same.

Solution to Problem

According to an aspect of the present invention, a shock absorber includes: a cylinder which is filled with a working fluid; a piston which is slidably fitted into the cylinder and divides the inside of the cylinder into two chambers of one side chamber and the other side chamber; a piston rod which is connected to the piston and extends to the outside of the cylinder; a first passage through which the working fluid flows from the one side chamber inside the cylinder when the piston moves in one direction; a second passage which communicates with one side chamber of the two chambers; a damping force generation mechanism which is provided in the first passage and generates a damping force; a communication hole which is provided with at least a part of a passage of the second passage and is formed in the piston rod communicating with at least one side chamber; a housing which has a passage of at least a part of the second passage formed therein; a bottomed cylindrical free piston which is movably provided inside the housing, defines the second passage into an upstream side and a downstream side of a flow of the working fluid when the piston moves in one direction, and includes a cylindrical portion and a bottom portion; and an elastic body which is provided between the free piston and the housing. In the shock absorber according to the aspect, the free piston is formed of a resin material.

Effects of Invention

According to the shock absorber, the generation of abnormal noise can be suppressed.

DESCRIPTION OF EMBODIMENTS

A shock absorber according to an embodiment of the present invention and a method of manufacturing the same will be described below with reference to the drawings.

Figure 1:
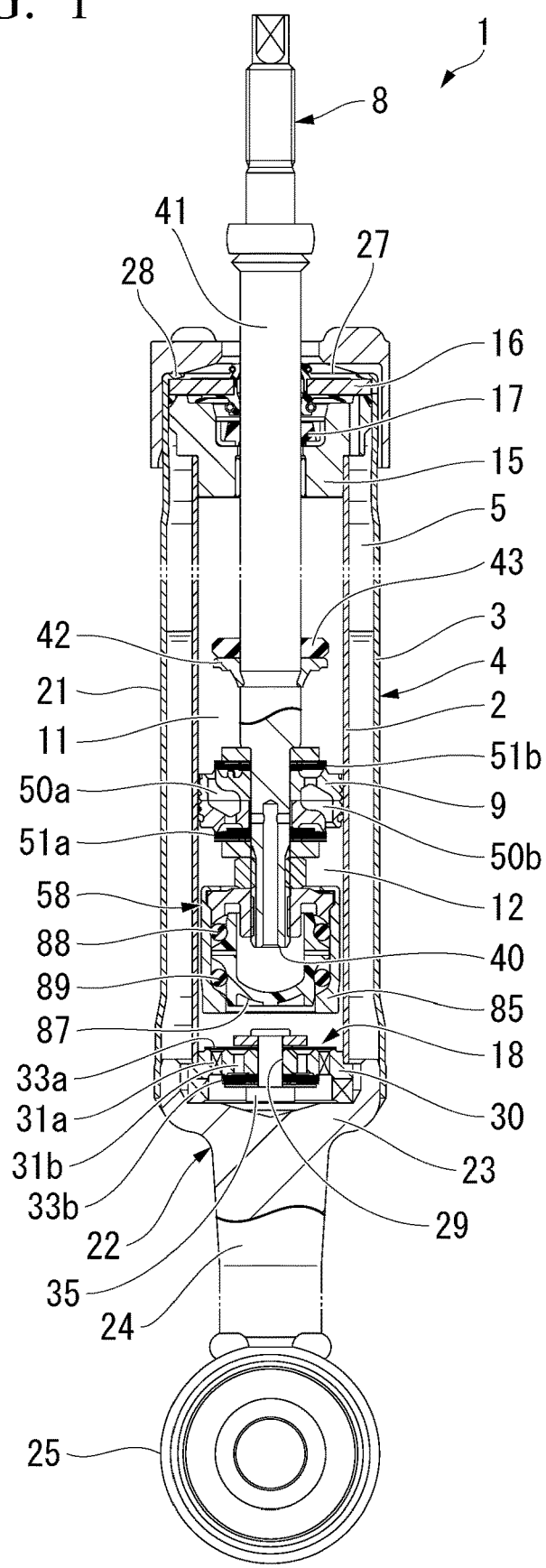
FIG. 1 is a cross-sectional view showing a shock absorber according to an embodiment of the present invention.

A shock absorber 1 according to the embodiment is a hydraulic shock absorber in which an oil liquid is used as a working fluid. A shock absorber 1 includes, as shown in FIG. 1, a double-tube cylinder 4 with an inner tube 2 and an outer tube 3. The diameter of the outer tube 3 is larger than that of the inner tube 2. The outer tube 3 is disposed coaxially with the inner tube 2 so as to cover the inner tube 2. A reservoir chamber 5 is formed between the inner tube 2 and the outer tube 3. In addition, the embodiment is not limited to the double tube type and can be also used in a single tube type shock absorber.

The shock absorber 1 includes a piston rod 8 and a piston 9. The piston 9 is connected to one end portion of the piston rod 8 in the axial direction. Thus, the piston 9 moves together with the piston rod 8. The piston rod 8 is disposed on the center axis of the inner tube 2 and the outer tube 3. In the piston rod 8, one end side in the axial direction is inserted into the inner tube 2 and the outer tube 3 (that is, the cylinder 4) and the other end side in the axial direction extends outward from the inner tube 2 and the outer tube 3 (that is, the cylinder 4). The piston 9 is fitted into the inner tube 2 of the cylinder 4 so as to be slidable. The piston 9 divides the inside of the inner tube 2 into two chambers, that is, a chamber 11 (one side chamber) and a chamber 12 (the other side chamber). In other words, the piston 9 is provided inside the cylinder 4 so as to be slidable and one end thereof is connected to the other end side of the piston rod 8 extending to the outside of the cylinder 4. The piston rod 8 is disposed so as to penetrate the chamber 11 in the chambers 11 and 12. Thus, the chamber 11 is a rod side chamber in which the piston rod 8 is mainly disposed in the shock absorber 1.

The inner tube 2 of the cylinder 4 is filled with an oil liquid which is a working fluid. The reservoir chamber 5 between the inner tube 2 and the outer tube 3 of the cylinder 4 is filled with an oil liquid as a working fluid and a gas of a high pressure (about 20 to 30 atm). That is, the cylinder 4 including the inner tube 2 and the outer tube 3 is filled with a working fluid. Additionally, the reservoir chamber 5 may be filled with atmospheric-pressure air instead of a high-pressure gas.

The shock absorber 1 includes a rod guide 15, a seal member 16, and a friction member 17. Further, the shock absorber 1 includes a base valve 18. The rod guide 15 is disposed at the position of the outward protruding end portion of the piston rod 8 in the cylinder 4. The rod guide 15 has a stepped shape, a large diameter side is fitted into the outer tube 3, and a small diameter side is fitted into the inner tube 2. The seal member 16 is disposed at the end portion of the cylinder 4 and outside the rod guide 15 in the axial direction of the cylinder 4. The friction member 17 is disposed between the seal member 16 and the rod guide 15. The base valve 18 is disposed at the end portion of the cylinder 4 opposite to the rod guide 15, the seal member 16, and the friction member 17 in the axial direction.

All of the rod guide 15, the seal member 16, and the friction member 17 are formed in an annular shape. The piston rod 8 is slidably inserted into each of the rod guide 15, the seal member 16, and the friction member 17. The rod guide 15 supports the piston rod 8 so as to be movable in the axial direction while regulating the movement in the radial direction and guides the movement of the piston rod 8.

The seal member 16 slides on the outer peripheral portion of the piston rod 8 moving in the axial direction at the inner peripheral portion thereof so as to prevent the oil liquid in the inner tube 2 and the high-pressure gas and the oil liquid in the reservoir chamber 5 inside the outer tube 3 from leaking to the outside. The friction member 17 slides on the outer peripheral portion of the piston rod 8 at the inner peripheral portion so as to generate friction resistance in the piston rod 8. Additionally, the friction member 17 is not intended for sealing.

The outer tube 3 of the cylinder 4 includes a cylindrical body member 21 and a bottom lid member 22. The bottom lid member 22 is fitted to one end of the body member 21 in the axial direction. The bottom lid member 22 includes a bottom lid portion 23 and a rod-shaped portion 24. The bottom lid portion 23 is fitted to the inner peripheral portion of the body member 21 at the outer peripheral portion thereof. The rod-shaped portion 24 extends toward the side opposite to the body member 21 from the center of the bottom lid portion 23 in the radial direction. The bottom lid member 22 is fixed to the body member 21 by welding in a sealed state while the bottom lid portion 23 is fitted to the body member 21. A attachment eye 25 is fixed to the side opposite to the bottom lid portion 23 of the rod-shaped portion 24 by welding. In the chambers 11 and 12, the chamber 12 which is on the side of the bottom lid portion 23 of the cylinder 4 is a bottom chamber inside the cylinder 4.

In the body member 21, the side opposite to the bottom lid member 22 is an opening 27. The body member 21 includes a locking portion 28 in the opening 27. The seal member 16 and the rod guide 15 are fitted to the side of the opening 27 of the body member 21. The locking portion 28 protrudes inward in the radial direction from the end portion position of the opening 27 in the body member 21 and sandwiches the seal member 16 between the locking portion and the rod guide 15.

A base body 30 of the base valve 18 is disposed inside the bottom lid portion 23. The base body 30 defines the reservoir chamber 5 and the chamber 12 inside the cylinder 4. The base body 30 has a stepped shape in which one side is smaller than the other side in the axial direction. The base body 30 is placed on the bottom lid portion 23 at the large diameter side and is positioned in the radial direction.

The inner tube 2 of the cylinder 4 has a cylindrical shape. In the inner tube 2, one end side in the axial direction is supported while being fitted to the small diameter side of the base body 30 of the base valve 18 and the other end side in the axial direction is supported while being fitted to the small diameter side of the rod guide 15 inside the opening 27 of the outer tube 3.

An insertion hole 29 which penetrates in the axial direction is formed at the center in the radial direction of the base body 30 of the base valve 18. Flow passages 31a and 31b which penetrate the base body 30 in the axial direction are formed around the insertion hole 29. These flow passages 31a and 31b can communicate the chamber 12 inside the inner tube 2 with the reservoir chamber 5 between the outer tube 3 and the inner tube 2. Further, a disk valve 33a is disposed on the side opposite to the bottom lid portion 23 in the base body 30 and a disk valve 33b is disposed on the side of the bottom lid portion 23. The disk valve 33a is a check valve. The disk valve 33a can open and close the outer flow passage 31a. The disk valve 33b is a damping valve. The disk valve 33b can open and close the inner flow passage 31b. The disk valves 33a and 33b are mounted to the base body 30 while the inner radial portion is clamped by a rivet 35 inserted into the insertion hole 29.

The disk valve 33b generates a damping force by allowing the flow of the oil liquid from the chamber 12 to the reservoir chamber 5 through a passage hole (not shown) of the disk valve 33a and the flow passage 31b of the base body 30 and regulates the flow of the oil liquid in the opposite direction. In contrast, the disk valve 33a allows the flow of the oil liquid from the reservoir chamber 5 to the chamber 12 through the flow passage 31a of the base body 30 without resistance and regulates the flow of the oil liquid in the opposite direction. The disk valve 33b is a contraction side damping valve which opens the flow passage 31b when the piston rod 8 moves to the contraction side to increase the entrance amount to the cylinder 4 and the piston 9 moves to the chamber 12 so that the pressure of the chamber 12 increases and generates a damping force at that time. Further, the disk valve 33a is a suction valve which opens the flow passage 31a when the piston rod 8 moves to the extension side to increase the protrusion amount from the cylinder 4 and the piston 9 moves to the chamber 11 so that the pressure of the chamber 12 decreases, but flows the oil liquid without substantially generating a damping force inside the chamber 12 from the reservoir chamber 5 at that time.

When the piston rod 8 moves to the extension side so that the protrusion amount from the cylinder 4 increases, the corresponding oil liquid flows from the reservoir chamber 5 to the chamber 12 through the flow passage 31a while opening the disk valve 33a. In contrast, when the piston rod 8 moves to the contraction side so that the insertion amount to the cylinder 4 increases, the corresponding oil liquid flows from the chamber 12 to the reservoir chamber 5 through the flow passage 31b while opening the disk valve 33b.

Additionally, the extension side damping force may be actively generated by the disk valve 33a which is the check valve. Further, these disk valves 33a and 33b may be eliminated and used as orifices.

The piston rod 8 includes an attachment shaft portion 40 and a main shaft portion 41. The attachment shaft portion 40 is a portion on which the piston 9 is attached. The attachment shaft portion 40 is formed at the insertion front end of the piston rod 8 into the cylinder 4. The main shaft portion 41 is a portion of the piston rod 8 other than the attachment shaft portion 40. The diameter of the main shaft portion 41 is larger than that of the attachment shaft portion 40. The piston rod 8 is inserted so as to be slidable on the inside of each of the rod guide 15, the seal member 16, and the friction member 17 in the main shaft portion 41. A retainer 42 is fixed to the main shaft portion 41 on the side of the attachment shaft portion 40 in relation to the insertion portion to the rod guide 15 so as to spread outward in the radial direction. A buffer 43 which is formed of an annular elastic material is provided on the side opposite to the attachment shaft portion 40 in the retainer 42 so that the main shaft portion 41 is inserted therethrough.

Figure 2:
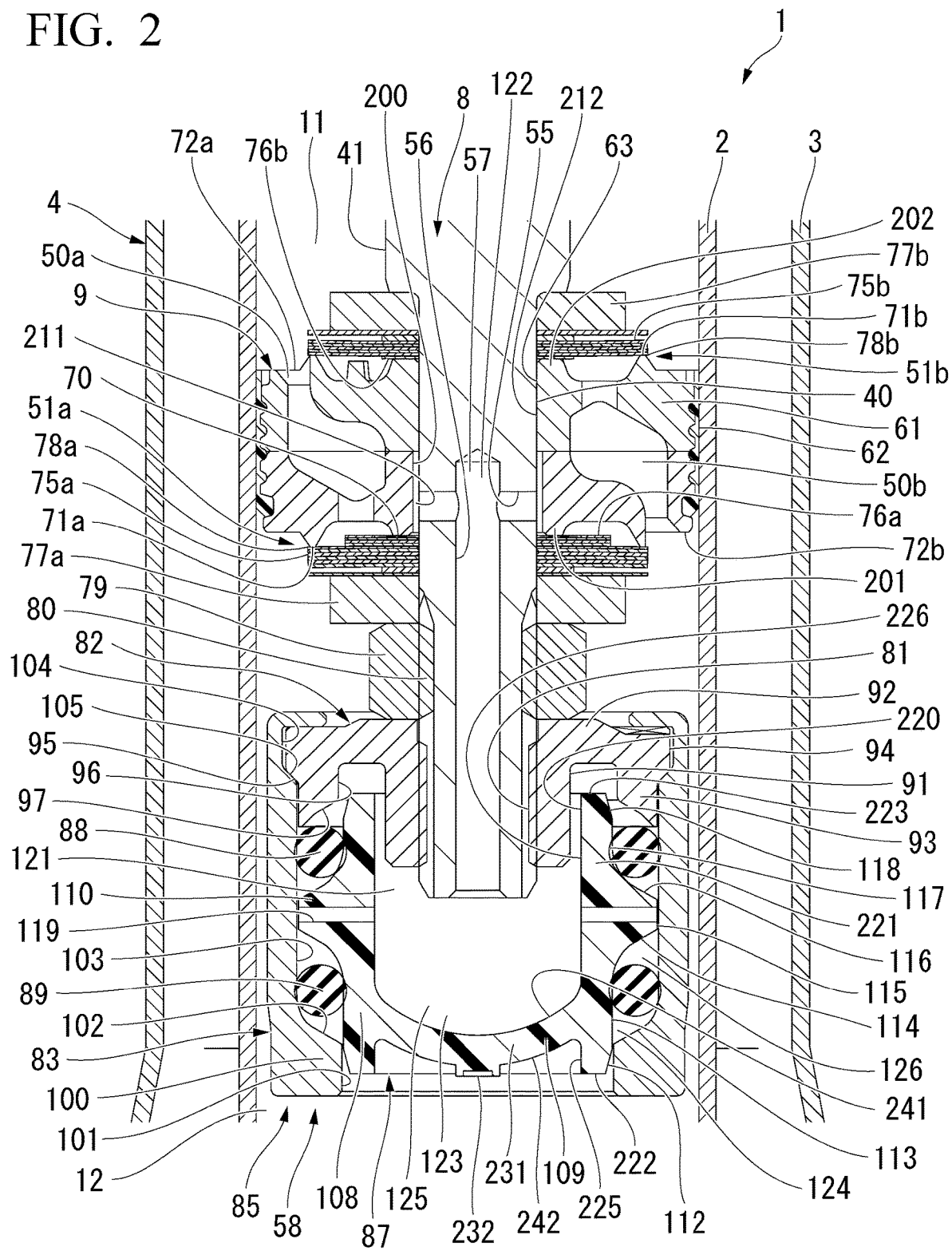
FIG. 2 is an enlarged cross-sectional view of a main part of the shock absorber according to an embodiment of the present invention.

As shown in FIG. 2, the piston 9 is provided with a plurality of (only one is shown in FIG. 2 in consideration of the cross-section) flow passages 50*a* (first and second passages) and a plurality of (only one is shown in FIG. 2 in consideration of the cross-section) flow passages 50*b*. The flow passage 50*a* and the flow passage 50*b* communicate the chamber 11 with the chamber 12. During the movement of the piston 9 toward the chamber 11, that is, the extension stroke in which the piston rod 8 extends from the cylinder 4, a damping force generation mechanism 51*b* to be described later provided in the flow passage 50*b* blocks the flow passage 50*b*. For this reason, the oil liquid passes through the flow passage 50*a* and flows from one side chamber 11 of the chamber 11 and the chamber 12 toward the other side chamber 12 in accordance with the movement of the piston 9. In other words, in the flow passage 50*a*, the working fluid flows from one side chamber 11 of the chamber 11 and the chamber 12 inside the cylinder 4 when the piston 9 moves in one direction. Meanwhile, during the movement of the piston 9 toward the chamber 12, that is, the contraction stroke in which the piston rod 8 enters the cylinder 4, a damping force generation mechanism 51*a* to be described later provided in the flow passage 50*a* blocks the flow passage 50*a*. For this reason, the oil liquid passes through the flow passage 50*b* and flows from the other side chamber 12 of the chamber 11 and the chamber 12 toward one side chamber 11 in accordance with the movement of the piston 9. In other words, in the flow passage 50*b*, the working fluid flows from the other side chamber 12 of the chamber 11 and the chamber 12 inside the cylinder 4 when the piston 9 moves in the other direction.

The piston 9 has the same number of the flow passages 50*a* and 50*b*.

The flow passages 50*a* are formed at an equal pitch so that one flow passage 50*b* is sandwiched between the adjacent ones in the circumferential direction. In the flow passage 50*a*, one side of the piston 9 in the axial direction (the side of the chamber 11) opens to the outside in the radial direction and the other side in the axial direction (the side of the chamber 12) opens to the inside in the radial direction. Then, these flow passages 50*a* are provided with the damping force generation mechanisms 51*a* that generate a damping force. The damping force generation mechanism 51*a* is disposed on the side of the chamber 12 in the axial direction of the piston 9. As described above, the flow passage 50*a* constitutes an extension side flow passage through which the oil liquid flows from the chamber 11 during the extension stroke. The damping force generation mechanism 51*a* provided in the flow passage 50*a* is an extension side damping force generation mechanism that generates a damping force by suppressing the flow of the oil liquid of the extension side flow passage 50*a*.

The flow passages 50*b* are formed at an equal pitch so that one flow passage 50*a* is sandwiched between the adjacent ones in the circumferential direction. In the flow passage 50*b*, the other side of the piston 9 in the axial direction (the side of the chamber 12) opens to the outside in the radial direction and one side in the axial direction (the side of the chamber 11) opens to the inside in the radial direction. Then, these flow passages 50*b* are provided with the damping force generation mechanisms 51*b* that generate a damping force. The damping force generation mechanism 51*b* is disposed on the side of the chamber 11 in the axial direction of the piston 9. The flow passage 50*b* constitutes a contraction side flow passage through which the oil liquid flows from the chamber 12 during the contraction stroke. The damping force generation mechanism 51*b* provided in the flow passage 50*b* is a contraction side damping force generation mechanism that generates a damping force by suppressing the flow of the oil liquid of the contraction side flow passage 50*b*.

The piston rod 8 is provided with a communication hole 55 which is formed at the position of the attachment shaft portion 40 so as to penetrate the attachment shaft portion 40 in the radial direction. Further, the piston rod 8 is provided with a communication hole 56 having a larger diameter than that of the communication hole 55 and formed from a position of the communication hole 55 toward the side opposite to the main shaft portion 41 in the axial direction.

The communication hole 56 communicates with the communication hole 55 and opens to the front end portion of the attachment shaft portion 40. These communication holes 55 and 56 constitute an in-rod passage 57 provided in the piston rod 8.

In the piston rod 8, a damping force changing mechanism 58 is attached to the piston 9 of the attachment shaft portion 40 on the side opposite to the main shaft portion 41. The damping force changing mechanism 58 is attached so as to cover the communication hole 56 of the in-rod passage 57. The inside of the damping force changing mechanism 58 communicates with the in-rod passage 57.

The shock absorber 1 is provided in each vehicle wheel of the vehicle. At that time, for example, one side of the shock absorber 1 is supported by the vehicle body and the other side thereof is fixed to the vehicle wheel side. Specifically, the piston rod 8 is connected to the vehicle body side and the attachment eye 25 on the side opposite to the protrusion side of the piston rod 8 of the cylinder 4 is connected to the vehicle wheel side. Contrary to the description above, the other side of the shock absorber 1 may be supported by the vehicle body and one side of the shock absorber 1 may be fixed to the vehicle wheel side.

When the vehicle wheels vibrate as the vehicle travels, the positions of the cylinder 4 and the piston rod 8 change relatively, but the change is suppressed by the fluid resistance of the passage formed in the piston 9. As will be described later, the fluid resistance of the passage formed in the piston 9 is made different depending on the speed and amplitude of vibration and the ride comfort is improved by suppressing the vibration.

An inertial force or centrifugal force generated in the vehicle body as the vehicle travels is applied between the cylinder 4 and the piston rod 8 in addition to the vibration generated by the vehicle wheel. For example, when the traveling direction is changed by the handle operation, a centrifugal force is generated in the vehicle body and a force based on the centrifugal force is applied between the cylinder 4 and the piston rod 8. As will be described later, the shock absorber 1 of the embodiment has good characteristics against a vibration based on the force generated in the vehicle body as the vehicle travels and high stability during the travel of the vehicle can be obtained.

The piston 9 includes a piston body 61 which has a substantially disk shape and a sliding member 62 that is attached to the outer peripheral surface of the piston body 61. The piston 9 slides on the inner peripheral surface of the inner tube 2 of the cylinder 4 in the sliding member 62. An insertion hole 63 is formed at the center in the radial direction of the piston body 61 so as to penetrate in the axial direction. The attachment shaft portion 40 of the piston rod 8 is inserted through the insertion hole 63. The flow passages 50a and 50b are formed in the piston body 61 so as to surround the insertion hole 63.

A valve seat 71a is formed at the end portion on the side of the chamber 12 in the axial direction of the piston body 61. The valve seat 71a is formed in an annular shape on the outside of the opening position of one end of the extension side flow passage 50a. A valve seat 71b is formed at the end portion on the side of the chamber 11 in the axial direction of the piston body 61. The valve seat 71b is formed in an annular shape on the outside of the opening position of one end of the contraction side flow passage 50b. The valve seat 71a constitutes the damping force generation mechanism 51a and the valve seat 71b constitutes the damping force generation mechanism 51b.

In the piston body 61, the side opposite to the insertion hole 63 of the valve seat 71a is an annular stepped portion 72b having a lower axial height than the valve seat 71a. The other end of the contraction side flow passage 50b opens at the position of the stepped portion 72b. Similarly, in the piston body 61, the side opposite to the insertion hole 63 of the valve seat 71b is an annular stepped portion 72a having a lower axial height than the valve seat 71b. The other end of the extension side flow passage 50a opens at the position of the stepped portion 72a.

The damping force generation mechanism 51a includes the valve seat 71a and an annular disk valve 75a which can be seated on the valve seat 71a. The disk valve 75a is formed by stacking a plurality of annular single disks. An interposed disk 76a having a smaller diameter than that of the disk valve 75a is disposed on the side of the piston body 61 of the disk valve 75a. An annular valve regulation member 77a having a smaller diameter than that of the disk valve 75a is disposed on the side opposite to the piston body 61 of the disk valve 75a. The interposed disk 76a is formed by stacking a plurality of annular single disks.

The damping force generation mechanism 51a includes a fixing orifice 78a which is provided between the valve seat 71a and the disk valve 75a so as to communicate the flow passage 50a with the chamber 12 even in the contact state. The fixing orifice 78a is formed by a groove formed in the valve seat 71a or an opening formed in the disk valve 75a. The disk valve 75a opens the flow passage 50a by separating from the valve seat 71a. At that time, the valve regulation member 77a regulates the deformation beyond the regulation in the opening direction of the disk valve 75a. The damping force generation mechanism 51a is provided in the flow passage 50a and generates a damping force by suppressing the flow of the oil liquid generated in the flow passage 50a due to the sliding of the piston 9 toward the chamber 11.

Similarly, the damping force generation mechanism 51b includes the valve seat 71b and an annular disk valve 75b that can be seated on the valve seat 71b. The disk valve 75b is also formed by stacking a plurality of annular single disks. An interposed disk 76b having a smaller diameter than that of the disk valve 75b is disposed on the side of the piston body 61 of the disk valve 75b. An annular valve regulation member 77b having a smaller diameter than that of the disk valve 75b is disposed on the side opposite to the piston body 61 of the disk valve 75b. The valve regulation member 77b comes into contact with an end surface on the side of the attachment shaft portion 40 of the main shaft portion 41 of the piston rod 8.

The damping force generation mechanism 51b includes a fixing orifice 78b between the valve seat 71b and the disk valve 75b. The fixing orifice 78b communicates the flow passage 50b with the chamber 11 even in a state in which the valve seat 71b comes into contact with the disk valve 75b.

The fixing orifice 78b is formed by a groove formed in the valve seat 71b or an opening formed in the disk valve 75b. The disk valve 75b opens the flow passage 50b by separating from the valve seat 71b. At that time, the valve regulation member 77b regulates the deformation beyond the regulation in the opening direction of the disk valve 75b. The damping force generation mechanism 51b is provided in the flow passage 50b. The damping force generation mechanism 51b generates a damping force by suppressing the flow of the oil liquid generated in the flow passage 50b due to the sliding of the piston 9 toward the chamber 12.

Among the single disks constituting the interposed disk 76a, the inner peripheral side of the single disk closest to the piston body 61 is notched. This notch portion constitutes an in-disk passage 70. An axial passage 200 extending in the axial direction is formed between the attachment shaft portion 40 of the piston rod 8 and the insertion hole 63 of the piston body 61. The in-disk passage 70 always communicates the axial passage 200 with the flow passage 50a. The communication hole 55 constituting the in-rod passage 57 of the piston rod 8 always communicates with the axial passage 200.

The piston body 61 includes two parts, that is, a piston body 201 on the side of the chamber 12 and a piston body 202 on the side of the chamber 11. The piston body 201 and the piston body 202 are positioned and integrated with each other in the circumferential direction and the radial direction at the uneven engagement portion (not shown).

A through-hole 211 constituting a part of the insertion hole 63 is formed in the center in the radial direction of the piston body 201 so as to penetrate in the axial direction. A through-hole 212 constituting a part of the insertion hole 63 is formed in the center in the radial direction of the piston body 202 so as to penetrate in the axial direction. The diameter of the through-hole 212 is smaller than that of the through-hole 211. The attachment shaft portion 40 of the piston rod 8 is fitted to the through-hole 212. The axial passage 200 is formed between the attachment shaft portion 40 of the piston rod 8 and the through-hole 211 of the piston body 201.

The valve seat 71a and the stepped portion 72b having an annular shape are formed in the piston body 201 on the side opposite to the piston body 202. The piston body 201 is provided with the disk valve 75a coming into contact with the valve seat 71a and the interposed disk 76a. In the interposed disk 76a, one side surface comes into contact with the piston body 201 and the other side surface comes into contact with the disk valve 75a. The outer diameter of the interposed disk 76a is smaller than that of the valve seat 71a.

The annular valve seat 71b and the stepped portion 72a are formed in the piston body 202 on the side opposite to the piston body 201. The piston body 202 is provided with the disk valve 75b coming into contact with the valve seat 71b and the interposed disk 76b. In the interposed disk 76b, one side surface comes into contact with the piston body 202 and the other side surface comes into contact with the disk valve 75b. The outer diameter of the interposed disk 76b is smaller than that of the valve seat 71b.

The in-rod passage 57 provided in the piston rod 8 always communicates with the in-disk passage 70 through the axial passage 200. The in-disk passage 70, the axial passage 200, and the in-rod passage 57 always communicate with the chamber 11 through the flow passage 50a.

A male screw 80 is formed on the front end side in relation to the communication hole 55 of the attachment shaft portion 40 of the piston rod 8. A nut 79 and the damping force changing mechanism 58 are threaded into the male screw 80. The damping force changing mechanism 58 is a frequency sensitive unit that changes a damping force without being controlled from the outside by the frequency (vibration state). The nut 79 sandwiches the valve regulation member 77a, the disk valve 75a, the interposed disk 76a, the piston 9, the interposed disk 76b, the disk valve 75b, and the valve regulation member 77b between the end surface of the main shaft portion 41 of the piston rod 8 and the nut while being threaded to the male screw 80. The damping force changing mechanism 58 is threaded to the male screw 80 until coming into contact with the nut 79.

The damping force changing mechanism 58 includes a housing 85 which includes a lid member 82 and a housing body 83, a free piston 87, an O-ring 88 which is a rubber member, and an O-ring 89 which is a rubber member.

The lid member 82 is provided with a female screw 81 which is threaded into the male screw 80 of the piston rod 8. The housing body 83 has a substantially cylindrical shape and one end opening side is attached to the lid member 82. The free piston 87 is provided inside the housing 85 so as to be movable in the axial direction. The O-ring 88 is provided between the free piston 87 and the lid member 82 of the housing 85. The O-ring 88 is a contraction side elastic body which is compressed when the free piston 87 moves toward the lid member 82 in the axial direction with respect to the housing 85. The O-ring 89 is provided between the free piston 87 and the housing body 83 of the housing 85. The O-ring 89 is an extension side elastic body which is compressed when the free piston 87 moves toward the opposite side with respect to the housing 85. Additionally, FIG. 2 shows the O-rings 88 and 89 in a natural state for convenience of description. Particularly, since the O-ring 89 also serves as a seal, it is always desirable to dispose the O-ring in non-circular shape in the cross-sectional view in the attachment state. The O-ring 88 is a resistance component which is compressed when the free piston 87 moves in one direction and generates a resisting force against the displacement of the free piston 87. The O-ring 89 is a resistance component which is compressed when the free piston 87 moves in the other direction and generates a resisting force against the displacement of the free piston 87.

The lid member 82 is formed of metal such as steel. The lid member 82 is mainly formed by cutting. The lid member 82 includes a lid inner cylindrical portion 91, a lid substrate portion 92, a lid outer cylindrical portion 93, and a fitting convex portion 94. The lid inner cylindrical portion 91 has a substantially cylindrical shape and the female screw 81 is formed in the inner peripheral portion of the lid inner cylindrical portion 91. The lid substrate portion 92 has a perforated disk shape extending radially outward from one axial end portion of the lid inner cylindrical portion 91. The lid outer cylindrical portion 93 extends in the same direction as the lid inner cylindrical portion 91 from the outer peripheral side of the lid substrate portion 92. The fitting convex portion 94 is formed in an annular shape protruding outward in the radial direction from the same side as the lid substrate portion 92 in the axial direction of the lid outer cylindrical portion 93. The fitting convex portion 94 includes a tapered surface portion 95 which is formed at the end portion on the side of the lid outer cylindrical portion 93 in the axial direction so as to gradually decrease in diameter and to be connected to the lid outer cylindrical portion 93.

The inner peripheral surface of the lid outer cylindrical portion 93 includes a cylindrical surface portion 96 and an inclined surface portion 97 in order from the lid substrate portion 92. The cylindrical surface portion 96 has the same diameter. The inclined surface portion 97 is connected to the cylindrical surface portion 96. The inclined surface portion 97 is formed in an annular shape so that the diameter increases as it goes away from the cylindrical surface portion 96 in the axial direction. The inclined surface portion 97 has a substantially arc-shaped cross-section on the surface including the center axis of the lid member 82.

The housing body 83 is formed of metal such as steel. The housing body 83 is mainly formed by cutting. The housing body 83 has a substantially cylindrical shape. The housing body 83 is provided with an inner annular protrusion 100 which is formed on one side of the axial direction so as to protrude inward in the radial direction. The inner peripheral surface of the housing body 83 is provided with a small diameter cylindrical surface portion 101, an inclined surface portion 102, a large diameter cylindrical surface portion 103, a tapered surface portion 105, and a fitting cylindrical surface portion 104 in order from one side in the axial direction. The small diameter cylindrical surface portion 101 has the same diameter.

The inclined surface portion 102 is connected to the small diameter cylindrical surface portion 101. The inclined surface portion 102 is formed in an annular shape so that the diameter increases as it goes away from the small diameter cylindrical surface portion 101. The large diameter cylindrical surface portion 103 is connected to the inclined surface portion 102. The large diameter cylindrical surface portion 103 has the same diameter larger than that of the small diameter cylindrical surface portion 101. The tapered surface portion 105 is connected to the large diameter cylindrical surface portion 103. The tapered surface portion 105 is formed in a tapered shape so that the diameter increases as it goes away from the large diameter cylindrical surface portion 103. The fitting cylindrical surface portion 104 is connected to the tapered surface portion 105. The fitting cylindrical surface portion 104 has the same diameter larger than that of the large diameter cylindrical surface portion 103. The inclined surface portion 102 has a substantially arc-shaped cross-section on the surface including the center axis of the housing body 83. The small diameter cylindrical surface portion 101 and the inclined surface portion 102 are formed in the inner annular protrusion 100. Additionally, although it is described that the housing body 83 has a cylindrical shape, the inner peripheral surface is preferably circular in cross-section, but the outer peripheral surface may be non-circular in cross-section such as a polygon.

In such a housing body 83, the fitting convex portion 94 of the lid member 82 is inserted into the fitting cylindrical surface portion 104 in a state in which the fitting cylindrical surface portion 104 extends to the end portion opposite to the inner annular protrusion 100 in the axial direction. Then, when a portion opposite to the inner annular protrusion 100 in the axial direction in relation to the fitting convex portion 94 of the housing body 83 is bent inward in the radial direction while the tapered surface portion 95 of the fitting convex portion 94 comes into contact with the tapered surface portion 105, the housing body 83 and the lid member 82 are integrated to be the housing 85. The lid outer cylindrical portion 93 of the lid member 82 forms an annular small diameter portion which protrudes inward in the radial direction in relation to the large diameter cylindrical surface portion 103 in the housing 85. The small diameter portion of the lid outer cylindrical portion 93 is provided with the inclined surface portion 97. Further, the inner annular protrusion 100 of the housing body 83 forms an annular small diameter portion which protrudes inward in the radial direction in relation to the large diameter cylindrical surface portion 103 in the housing 85. The small diameter portion of the inner annular protrusion 100 is provided with the inclined surface portion 102. In the housing 85, the inclined surface portion 97 and the inclined surface portion 102 are disposed so as to face each other in the axial direction.

Figure 3:
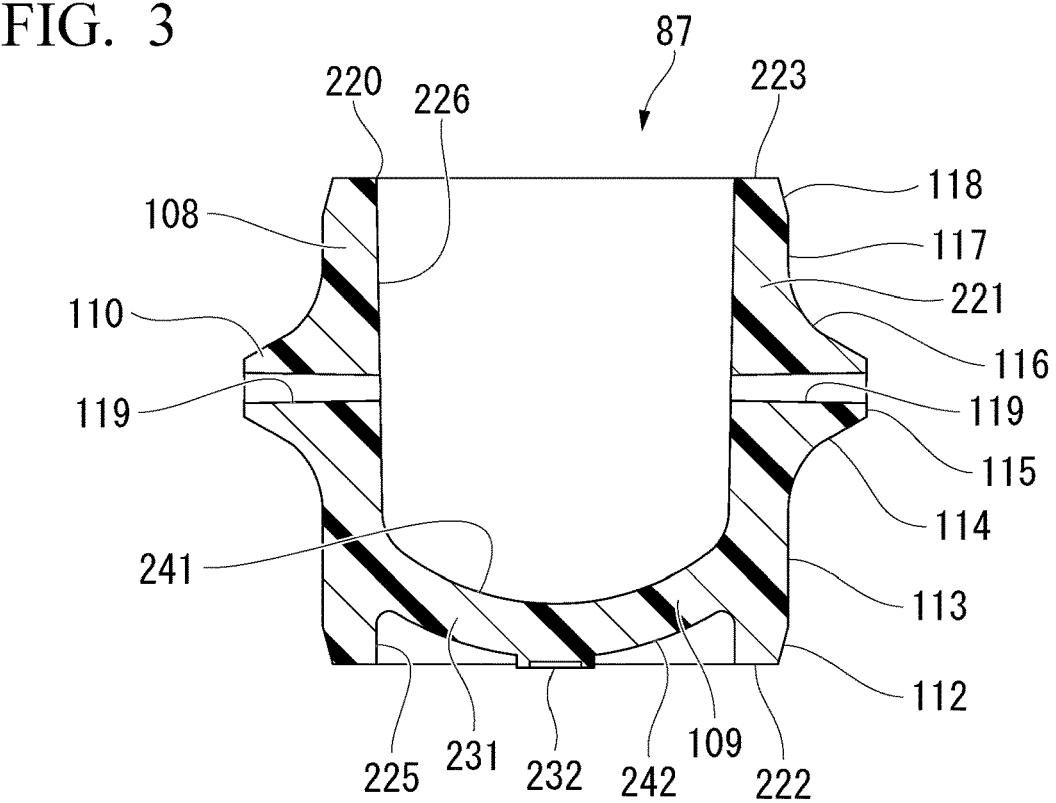
FIG. 3 is a cross-sectional view showing a free piston of the shock absorber according to an embodiment of the present invention.
Figure 4:
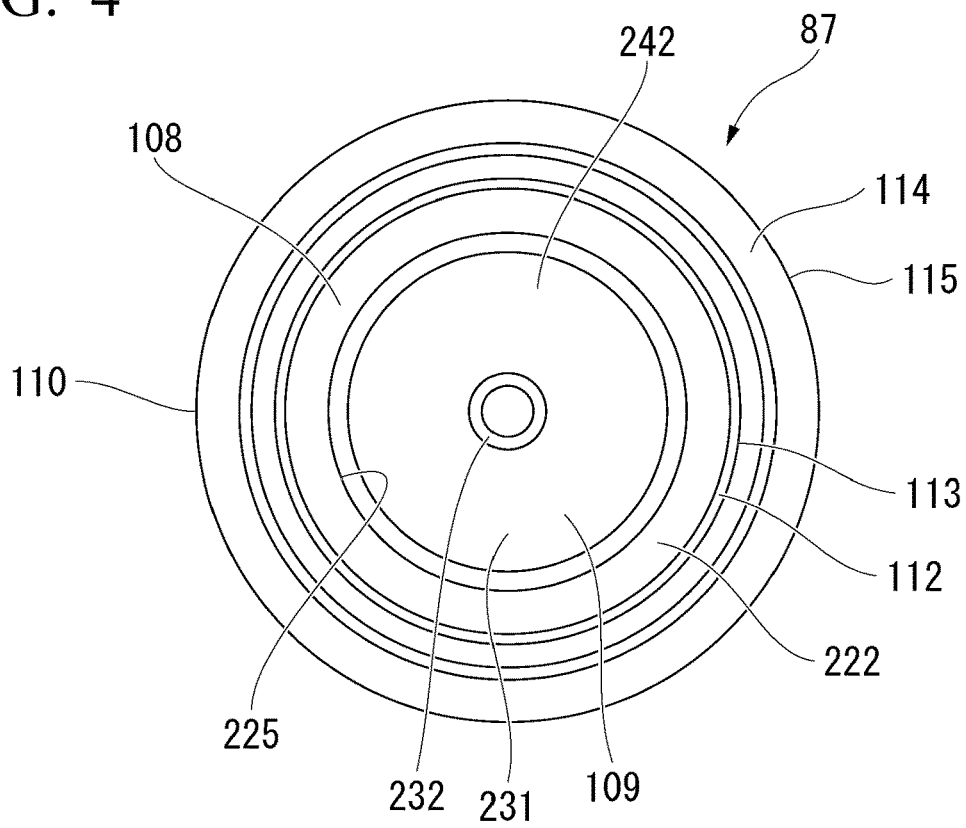
FIG. 4 is a bottom view showing the free piston of the shock absorber according to an embodiment of the present invention.

The free piston 87 is an integrally molded product which is formed of, for example, a synthetic resin material such as polyacetal. The free piston 87 includes, as shown in FIGS. 3 and 4, a piston cylindrical portion 108 (a cylindrical portion) having a substantially cylindrical shape and a piston bottom portion 109 (a bottom portion) having a curved plate shape. The piston bottom portion 109 is formed so as to block one end side of the piston cylindrical portion 108 in the axial direction. The side opposite to the piston bottom portion 109 in the axial direction of the piston cylindrical portion 108 is an opening 220. The free piston 87 is formed in a bottomed cylindrical shape with a piston cylindrical portion 108 and a piston bottom portion 109. The free piston 87 is formed of only a resin material.

The piston cylindrical portion 108 is provided with an outer annular protrusion portion 110 (a protrusion portion, a convex portion) which is formed at an intermediate position in the axial direction so as to protrude outward in the radial direction from the outer peripheral side. The outer annular protrusion portion 110 has a diameter larger than that of a cylindrical portion main body 221 except for the outer annular protrusion portion 110 of the piston cylindrical portion 108 and has an annular shape protruding outward in the radial direction. In other words, the free piston 87 includes the outer annular protrusion portion 110 which protrudes from the outer peripheral side of the piston cylindrical portion 108.

An end surface 222 on the side opposite to the opening 220 of the piston cylindrical portion 108 in the axial direction spreads in a direction perpendicular to the axis of the piston cylindrical portion 108. An end surface 223 on the side of the opening 220 of the piston cylindrical portion 108 in the axial direction also spreads in a direction perpendicular to the axis of the piston cylindrical portion 108. In the inner peripheral surface of the piston cylindrical portion 108, the side opposite to the opening 220 in relation to the piston bottom portion 109 is a cylindrical surface portion 225 and the side of the opening 220 in relation to the piston bottom portion 109 is a cylindrical surface portion 226. The cylindrical surface portions 225 and 226 are cylindrical surfaces having the same coaxial diameter. The end surfaces 222 and 223 and the cylindrical surface portions 225 and 226 are formed in the cylindrical portion main body 221.

The outer peripheral surface of the piston cylindrical portion 108 is provided with a tapered surface portion 112, a small diameter cylindrical surface portion 113, an inclined surface portion 114, a large diameter cylindrical surface portion (an annular convex portion) 115, an inclined surface portion 116, a small diameter cylindrical surface portion 117, and a tapered surface portion 118 in order from the side opposite to the opening 220 in the axial direction. The tapered surface portion 112, the small diameter cylindrical surface portion 113, the small diameter cylindrical surface portion 117, and the tapered surface portion 118 are formed in the cylindrical portion main body 221. The inclined surface portion 114, the large diameter cylindrical surface portion 115, and the inclined surface portion 116 are formed in the outer annular protrusion portion 110.

The tapered surface portion 112 is formed in a tapered shape so that the diameter decreases as it goes toward the side opposite to the small diameter cylindrical surface portion 113 in the axial direction. The small diameter cylindrical surface portion 113 is connected to the large diameter side of the tapered surface portion 112 and has the same diameter. The inclined surface portion 114 is connected to the small diameter cylindrical surface portion 113. The inclined surface portion 114 formed in an annular shape so that the diameter increases as it goes away from the small diameter cylindrical surface portion 113 in the axial direction. The large diameter cylindrical surface portion 115 is connected to the large diameter side of the inclined surface portion 114. The large diameter cylindrical surface portion 115 has the same diameter larger than that of the small diameter cylindrical surface portion 113. The inclined surface portion 114 has a substantially arc-shaped cross-section on the surface including the center axis of the free piston 87.

The inclined surface portion 116 is connected to the large diameter cylindrical surface portion 115. The inclined surface portion 116 is formed in an annular shape so that the diameter decreases as it goes away from the large diameter cylindrical surface portion 115. The small diameter cylindrical surface portion 117 is connected to the small diameter side of the inclined surface portion 116. The small diameter cylindrical surface portion 117 has the same diameter as that of the small diameter cylindrical surface portion 113. The tapered surface portion 118 is connected to the small diameter cylindrical surface portion 117. The tapered surface portion 118 is formed in a tapered shape so that the diameter decreases as it goes toward the side opposite to the small diameter cylindrical surface portion 117 in the axial direction. The inclined surface portion 116 has a substantially arc-shaped cross-section on the surface including the center axis of the free piston 87. The outer annular protrusion portion 110 has a symmetrical shape with respect to a plane passing through the center position of the axial direction.

The free piston 87 is provided with passage holes 119 (through-holes) formed at a plurality of positions at intervals in the circumferential direction of the free piston 87. The passage hole 119 is formed at the center position of the outer annular protrusion portion 110 in the axial direction. In other words, the passage hole 119 is formed at the center position of the large diameter cylindrical surface portion 115 in the axial direction. The passage hole 119 is formed at the position of the outer annular protrusion portion 110 in the axial direction of the piston cylindrical portion 108 so as to penetrate in the radial direction. The passage hole 119 is formed in a tapered shape so that the diameter decreases as it goes inward in the radial direction of the piston cylindrical portion 108. Specifically, the passage holes 119 are formed at two positions which are different from each other by 180° in the circumferential direction of the free piston 87.

The piston bottom portion 109 is curved in a spherical shape so as to move away from the opening 220 in the axial direction as it goes toward the center side in the radial direction. The piston bottom portion 109 includes a bottom portion main body 231 which is connected to the cylindrical portion main body 221 of the piston cylindrical portion 108 and blocks the inside of the cylindrical portion main body 221 and a protrusion 232 which protrudes toward the side opposite to the opening 220 from the center position of the bottom portion main body 231 in the radial direction.

The piston bottom portion 109 is curved in a spherical shape so that the bottom portion main body 231 moves away from the opening 220 in the axial direction as it goes toward the center side in the radial direction. That is, in the bottom portion main body 231, a bottom surface portion 241 (a first bottom surface portion) which is on the side of the opening 220 and faces the opening 220 is recessed in a curved shape and a bottom surface portion 242 (a second bottom surface portion) which is on the side opposite to the opening 220 and faces the side opposite to the opening 220 protrudes in a curved shape.

The cylindrical surface portion 225 of the cylindrical portion main body 221 extends from the outer peripheral edge portion of the bottom surface portion 242 in a direction opposite to the opening 220. The cylindrical surface portion 226 extends from the outer peripheral edge portion of the bottom surface portion 241 in a direction of the opening 220.

Figure 5:
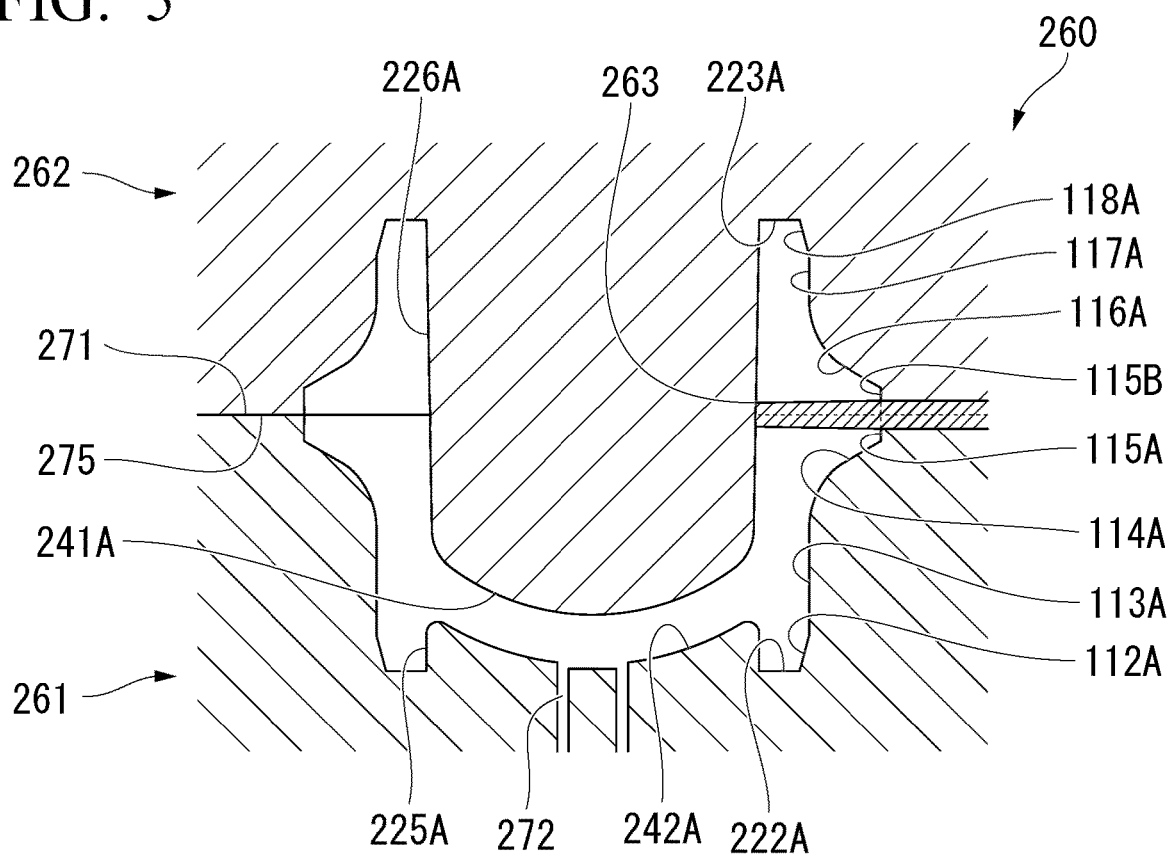
FIG. 5 is a cross-sectional view showing a mold for manufacturing the free piston of the shock absorber according to an embodiment of the present invention.

As shown in FIG. 5, a mold 260 for molding the free piston 87 includes a first mold 261, a second mold 262, and a pin 263. Additionally, the mold 260 includes a plurality of pins 263, but in FIG. 5, the mold 260 has a cross-section at the position with and without the pin 263. Thus, in FIG. 5, only one pin 263 is shown. All of the first mold 261, the second mold 262, and the plurality of pins 263 are formed of metal.

The first mold 261 includes a bottom surface portion formation surface 242A which forms the bottom surface portion 242 of the free piston 87 shown in FIG. 3, a cylindrical surface portion formation surface 225A which forms the cylindrical surface portion 225, an end surface formation surface 222A which forms the end surface 222, a tapered surface portion formation surface 112A which forms the tapered surface portion 112, a small diameter cylindrical surface portion formation surface 113A which forms the small diameter cylindrical surface portion 113, an inclined surface portion formation surface 114A which forms the inclined surface portion 114, a large diameter cylindrical surface portion formation surface 115A which forms a half on the side of the inclined surface portion 114 of the large diameter cylindrical surface portion 115, and a mating surface 271 with the second mold 262. The first mold 261 includes a resinous inlet 272 formed at the center position of the bottom surface portion formation surface 242A in the radial direction.

The second mold 262 includes a bottom surface portion formation surface 241A which forms the bottom surface portion 241 of the free piston 87, a cylindrical surface portion formation surface 226A which forms the cylindrical surface portion 226, an end surface formation surface 223A which forms the end surface 223, a tapered surface portion formation surface 118A which forms the tapered surface portion 118, a small diameter cylindrical surface portion formation surface 117A which forms the small diameter cylindrical surface portion 117, an inclined surface portion formation surface 116A which forms the inclined surface portion 116, a large diameter cylindrical surface portion formation surface 115B which forms a half on the side of the inclined surface portion 116 of the large diameter cylindrical surface portion 115, and a mating surface 275 with the first mold 261. The large diameter cylindrical surface portion formation surfaces 115A and 115B have the same coaxial diameter and have the same axial length.

The plurality of pins 263 are provided at the positions of the mating surfaces 271 and 275 in parallel to the mating surfaces 271 and 275. The plurality of pins 263 are movable in the radial direction of the large diameter cylindrical surface portion formation surfaces 115A and 115B. The plurality of pins 263 move in a reciprocating manner between a forward movement position in which the pins come into contact with the cylindrical surface portion formation surface 226A and a backward movement position in which the pins are retracted from the large diameter cylindrical surface portion formation surfaces 115A and 115B. The plurality of pins 263 are portions forming the plurality of passage holes 119 and have a tapered shape.

Specifically, the plurality of pins 263 are provided at two positions. The plurality of pins 263 are disposed at positions which are different from each other by 180° in the circumferential direction of the large diameter cylindrical surface portion formation surfaces 115A and 115B.

The mold 260 is filled with a melted resin material from the inlet 272 while the plurality of pins 263 are located at the forward movement position after the mating surfaces 271 and 275 of the first mold 261 and the second mold 262 abut each other. In this way, the mold 260 is filled with the resin material so that the free piston 87 is integrally molded. Then, after the resin material is cured, the mating surfaces 271 and 275 of the first mold 261 and the second mold 262 are separated from each other, the plurality of pins 263 are retracted, and the free piston 87 is separated from the mold 260. Here, the protrusion 232 of the piston bottom portion 109 is formed by the resin material in the inlet 272 of the first mold 261.

Figure 6:
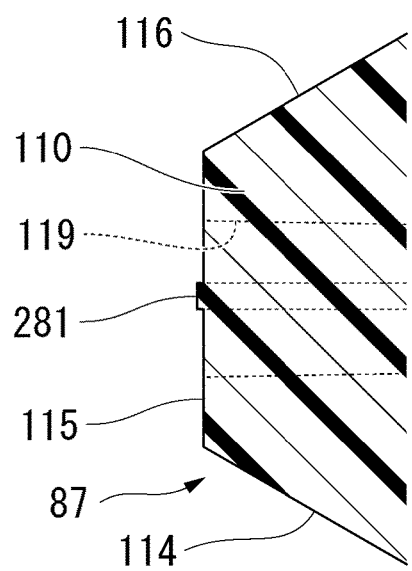
FIG. 6 is an enlarged cross-sectional view showing a part of the free piston of the shock absorber according to an embodiment of the present invention.

Since the free piston 87 is formed by dividing the mold 260 as described above, a residual streak 281 shown in FIG. 6 and having an annular shape formed by the mating surfaces 271 and 275 is formed at the intermediate position of the large diameter cylindrical surface portion 115 in the axial direction. In other words, the free piston 87 has the residual streak 281 generated by dividing the mold 260 at the position of the outer annular protrusion portion 110. The residual streak 281 and the passage hole 119 are formed at the center position of the large diameter cylindrical surface portion 115 in the axial direction. Thus, the positions of the residual streak 281 and the passage hole 119 are the same in the axial direction of the large diameter cylindrical surface portion 115. In other words, the passage hole 119 which penetrates the piston cylindrical portion 108 is formed at the position of the residual streak 281 in the free piston 87.

As shown in FIG. 2, the free piston 87 is disposed inside the housing 85 so that the piston bottom portion 109 is disposed on the side of the inner annular protrusion 100 in the axial direction. In a state in which the free piston 87 is disposed inside the housing 85, the large diameter cylindrical surface portion 115 slides on the position of the large diameter cylindrical surface portion 103 of the housing body 83 in the axial direction. Further, in a state in which the free piston 87 is disposed inside the housing 85, one tapered surface portion 112 and the small diameter cylindrical surface portion 113 move at the position of the small diameter cylindrical surface portion 101 of the housing body 83 in the axial direction. Further, in a state in which the free piston 87 is disposed inside the housing 85, the other small diameter cylindrical surface portion 117 and the tapered surface portion 118 move at the position of the cylindrical surface portion 96 of the lid outer cylindrical portion 93 of the lid member 82 in the axial direction.

In a state in which the free piston 87 is disposed inside the housing 85, the inclined surface portion 102 of the housing body 83 and the inclined surface portion 114 of the free piston 87 overlap each other in the radial direction. Thus, the inclined surface portion 102 of the housing body 83 and the inclined surface portion 114 of the free piston 87 face each other in the movement direction of the free piston 87. In addition, the inclined surface portion 97 of the lid outer cylindrical portion 93 of the lid member 82 and the inclined surface portion 116 of the free piston 87 overlap each other in the radial direction. Thus, the inclined surface portion 97 of the lid member 82 and the inclined surface portion 116 of the free piston 87 face each other in the movement direction of the free piston 87.

Then, the O-ring 89 (in a natural state shown in FIG. 2) is disposed between the small diameter cylindrical surface portion 113 and the inclined surface portion 114 of the free piston 87 and the inclined surface portion 102 and the large diameter cylindrical surface portion 103 of the housing body 83. In other words, the O-ring 89 is disposed between the outer annular protrusion portion 110 of the free piston 87 and the inner annular protrusion 100 of the housing 85. In other words, the free piston 87 includes the outer annular protrusion portion 110 in which the O-ring 89 corresponding to an elastic body is provided between the outer annular protrusion portion and the housing 85. The O-ring 89 has a circular shape in cross-section including the center axis in a natural state. When the O-ring 89 is in a natural state, the inner diameter is smaller than the small diameter cylindrical surface portion 113 of the free piston 87 and the outer diameter is larger than the large diameter cylindrical surface portion 103 of the housing body 83. That is, the O-ring 89 is fitted to both the free piston 87 and the housing 85 with an allowance in the radial direction.

Further, the O-ring 88 (in a natural state shown in FIG. 2) is disposed between the large diameter cylindrical surface portion 103 and the inclined surface portion 97 of the housing 85 and the inclined surface portion 116 and the small diameter cylindrical surface portion 117 of the free piston 87. In other words, the O-ring 88 is disposed between the outer annular protrusion portion 110 of the free piston 87 and the lid outer cylindrical portion 93 of the housing 85. In other words, the free piston 87 includes the outer annular protrusion portion 110 in which the O-ring 88 corresponding to an elastic body is provided between the outer annular protrusion portion and the housing 85. The O-ring 88 has a circular shape in cross-section including the center axis in a natural state. When the O-ring 88 is in a natural state, the inner diameter is smaller than the small diameter cylindrical surface portion 117 of the free piston 87 and the outer diameter is larger than the large diameter cylindrical surface portion 103 of the housing 85. That is, the O-ring 88 is also fitted to both the free piston 87 and the housing 85 with an allowance in the radial direction.

Both O-rings 88 and 89 are common parts of the same size. The O-rings 88 and 89 urge the free piston 87 so that the free piston is maintained at a predetermined neutral position in the axial direction with respect to the housing 85 inside the housing 85. At the same time, the O-rings 88 and 89 are elastically deformed so as to allow the movement of the free piston 87 with respect to the housing 85 toward both sides in the axial direction.

In the free piston 87, the O-ring 88 contacts the small diameter cylindrical surface portion 117 and the inclined surface portion 116. In the small diameter cylindrical surface portion 117 and the inclined surface portion 116, the inclined surface portion 116 is inclined with respect to the movement direction of the free piston 87. Further, in the housing 85, the O-ring 88 contacts the large diameter cylindrical surface portion 103 and the inclined surface portion 97. In the large diameter cylindrical surface portion 103 and the inclined surface portion 97, the inclined surface portion 97 is inclined with respect to the movement direction of the free piston 87.

In the free piston 87, the O-ring 89 contacts the small diameter cylindrical surface portion 113 and the inclined surface portion 114. In the small diameter cylindrical surface portion 113 and the inclined surface portion 114, the inclined surface portion 114 is inclined with respect to the movement direction of the free piston 87. Further, in the housing 85, the O-ring 89 contacts the large diameter cylindrical surface portion 103 and the inclined surface portion 102. In the large diameter cylindrical surface portion 103 and the inclined surface portion 102, the inclined surface portion 102 is inclined with respect to the movement direction of the free piston 87.

In other words, the outer annular protrusion portion 110 is provided in the outer peripheral portion of the free piston 87 and both surfaces of the outer annular protrusion portion 110 in the axial direction form the inclined surface portion 114 and the inclined surface portion 116.

Further, the inner annular protrusion 100 including the inclined surface portion 102 and the lid outer cylindrical portion 93 including the inclined surface portion 97 are provided at both side positions of the outer annular protrusion portion 110 in the inner periphery of the housing 85. The O-ring 89 is provided between the outer annular protrusion portion 110 and the inner annular protrusion 100. Further, the O-ring 88 is provided between the outer annular protrusion portion 110 and the lid outer cylindrical portion 93.

Additionally, in a case in which the damping force changing mechanism 58 is assembled, for example, the O-ring 89 is inserted into the housing body 83 to the position of the inclined surface portion 102. Then, the free piston 87 is fitted into the housing body 83 and the O-ring 89. At that time, in the free piston 87, the large diameter cylindrical surface portion 115 is guided to the large diameter cylindrical surface portion 103 of the housing body 83. Then, the tapered surface portion 112 is inserted into the O-ring 89 and the small diameter cylindrical surface portion 101 of the housing body 83 from the small diameter side. Next, the O-ring 88 is inserted between the housing body 83 and the free piston 87 to the position of the inclined surface portion 116. Then, the lid member 82 is inserted into the housing body 83 and the housing body 83 is caulked. The damping force changing mechanism 58 which is assembled in this way is attached to the male screw 80 of the attachment shaft portion 40 of the piston rod 8 by threading the female screw 81. At that time, the lid substrate portion 92 of the housing 85 comes into contact with the nut 79.

The outer diameter of the damping force changing mechanism 58, that is, the outer diameter of the housing 85 is set to be smaller than the inner diameter of the inner tube 2 to a degree that the flow resistance does not occur.

In the damping force changing mechanism 58, an in-housing passage 121 is formed among the housing 85, the free piston 87, and the O-rings 88 and 89. A part of the flow passage 50a, the in-disk passage 70, the axial passage 200, the in-rod passage 57, and the in-housing passage 121 constitute a rod side passage 122 (a second passage) communicating with one chamber 11 of two chambers 11 and 12. In the rod side passage 122, the in-disk passage 70 is an orifice. In the rod side passage 122, when the pressure of the chamber 11 increases in accordance with the movement of the piston 9 toward the chamber 11, the oil liquid flows from the chamber 11. That is, when the piston 9 moves toward the chamber 11, the oil liquid flows from the chamber 11 to the rod side passage 122. The communication holes 55 and 56 formed in the piston rod 8 form a passage of at least a part of the rod side passage 122 and communicate with at least one chamber 11 of two chambers 11 and 12. The inside of the in-housing passage 121 formed in the housing 85 is a passage of at least a part of the rod side passage 122.

The in-housing passage 121 is defined by the O-ring 89, the free piston 87, and the housing 85 as a rod chamber side passage portion 123 which communicates with the chamber 11 on the side of the piston rod 8 and a bottom chamber side passage portion 124 which communicates with the chamber 12 on the bottom side. The rod chamber side passage portion 123 includes a chamber 125, the passage hole 119, and a chamber 126. The chamber 125 is surrounded by the lid member 82, the free piston 87, and the O-ring 88 and the in-rod passage 57 opens.

The passage hole 119 is formed in the free piston 87 and one end of the chamber 125 opens. The chamber 126 is surrounded by the housing body 83, the O-ring 88, the O-ring 89, and the free piston 87 and the other end of the passage hole 119 opens. The bottom chamber side passage portion 124 is formed as a portion surrounded by the free piston 87, the O-ring 89, and the side of the inner annular protrusion 100 of the housing body 83.

The free piston 87 has a cylindrical shape in which an outer periphery of the free piston is provided with the outer annular protrusion portion 110 including the annular large diameter cylindrical surface portion 115 and the piston bottom portion 109 having a higher pressure than the outer annular protrusion portion 110 in the axial direction during the contraction stroke is formed in the chamber 12 inside the free piston 87. The O-rings 88 and 89 corresponding to the annular elastic bodies are provided at both sides in the axial direction of the outer annular protrusion portion 110 of the outer periphery of the free piston 87. The free piston 87 is provided with the passage hole 119 communicating the chamber 126 between the annular O-rings 88 and 89 with the chamber 125 located on the side of the chamber 11 and having a high pressure during the extension stroke inside the free piston 87.

When the piston 9 moves toward the chamber 11 during the extension stroke, the oil liquid of the chamber 11 having a high pressure in the chambers 11 and 12 flows to the flow passage 50a, the in-disk passage 70, the axial passage 200, the in-rod passage 57, and the rod chamber side passage portion 123 in the rod side passage 122. Then, the free piston 87 moves toward the side opposite to the lid member 82 in the axial direction with respect to the housing 85 while discharging the oil liquid of the bottom chamber side passage portion 124 to the chamber 12. At that time, the O-ring 89 provided between the free piston 87 and the housing 85 comes into contact with the inclined surface portion 114 of the outer annular protrusion portion 110 located between the O-rings 88 and 89 of the outer peripheral portion of the free piston 87 and the inclined surface portion 102 of the inner annular protrusion 100 of the inner peripheral portion of the housing 85 and is elastically deformed while being sandwiched therebetween. That is, the one O-ring 89 generates an elastic force with respect to the movement of the free piston 87 toward one side during the extension stroke.

When the piston 9 moves toward the chamber 12 during the contraction stroke, the oil liquid of the chamber 12 having a high pressure in the chambers 11 and 12 presses the free piston 87. Then, the free piston 87 moves toward the lid member 82 in the axial direction with respect to the housing 85 while injecting the oil liquid into the bottom chamber side passage portion 124. At that time, the other O-ring 88 provided between the free piston 87 and the housing 85 comes into contact with the inclined surface portion 116 of the outer annular protrusion portion 110 of the outer peripheral portion of the free piston 87 and the inclined surface portion 97 of the lid outer cylindrical portion 93 of the inner peripheral portion of the housing 85 and is elastically deformed while being sandwiched therebetween. That is, the other O-ring 88 generates an elastic force with respect to the movement of the free piston 87 toward the other side during the contraction stroke.

In the piston bottom portion 109 of the free piston 87, the bottom surface portion 241 on the side of the chamber 11 having a high pressure during the extension stroke in the chambers 11 and 12 is recessed in a curved shape and the bottom surface portion 242 on the side of the chamber 12 having a high pressure during the contraction stroke in the chambers 11 and 12 protrudes in a curved shape. In other words, in the piston bottom portion 109, the bottom surface portion 241 facing the rod chamber side passage portion 123 communicating with the chamber 11 having a high pressure during the extension stroke in the chambers 11 and 12 is recessed in a curved shape and the bottom surface portion 242 facing the chamber 12 having a high pressure during the contraction stroke in the chambers 11 and 12 protrudes in a curved shape.

During the movement of the free piston 87, the O-ring 89, the free piston 87, and the housing 85 define the rod chamber side passage portion 123 and the bottom chamber side passage portion 124. Thus, the free piston 87 defines the rod side passage 122 as the flow passage 50a, the in-disk passage 70, the axial passage 200, the in-rod passage 57, and the rod chamber side passage portion 123 on the upstream side of the flow of the oil liquid when the piston 9 moves in one direction during the extension stroke and the bottom chamber side passage portion 124 on the downstream side thereof. The free piston 87 defines the rod side passage 122 as the bottom chamber side passage portion 124 on the upstream side of the flow of the oil liquid when the piston 9 moves in the other direction during the contraction stroke and the rod chamber side passage portion 123, the in-rod passage 57, the axial passage 200, the in-disk passage 70 and the flow passage 50a on the downstream side thereof.

Next, an operation of the above-described shock absorber 1 will be described.

During the extension stroke in which the piston rod 8 moves to the extension side, the oil liquid flows from the chamber 11 to the chamber 12 through the flow passage 50a. When the piston speed is in the very low speed range, the oil liquid introduced from the chamber 11 to the flow passage 50a basically flows to the chamber 12 through the normally opened fixing orifice 78a formed between the valve seat 71a and the disk valve 75a coming into contact with the valve seat 71a. At that time, a damping force of an orifice characteristic (the damping force is almost proportional to the square of the piston speed) is generated. When the piston speed increases and reaches a low speed range, the oil liquid introduced from the chamber 11 to the flow passage 50a basically passes between the disk valve 75a and the valve seat 71a while opening the disk valve 75a and flows to the chamber 12. For this reason, a damping force of a valve characteristic (the damping force is almost proportional to the piston speed) is generated.

During the contraction stroke in which the piston rod 8 moves to the contraction side, the oil liquid flows from the chamber 12 to the chamber 11 through the flow passage 50b. When the piston speed is in the very low speed range, the oil liquid introduced from the chamber 12 into the flow passage 50b basically flows to the chamber 11 through the normally opened fixing orifice 78*b* formed between the valve seat 71*b* and the disk valve 75*b* coming into contact with the valve seat 71*b*. At that time, a damping force of an orifice characteristic (the damping force is almost proportional to the square of the piston speed) is generated. Further, when the piston speed increases and reaches a low speed range, the oil liquid introduced from the chamber 12 to the flow passage 50*b* basically passes between the disk valve 75*b* and the valve seat 71*b* while opening the disk valve 75*b* and flows to the chamber 11. For this reason, a damping force of a valve characteristic (the damping force is almost proportional to the piston speed) is generated.

Here, when the piston speed is low, that is, a very low speed range (for example, 0.05 m/s) in which a frequency is relatively high (for example, 7 Hz or more), a vibration is generated from, for example, an unevenness of a fine surface of a road surface. In such a condition, it is desirable to decrease the damping force. Similarly, even when the piston speed is low, that is, a range in which a frequency is relatively low (for example, 2 Hz or less) contrary to the description above, a vibration such as wobbling is generated by the roll of the vehicle body. In such a condition, it is desirable to increase the damping force.

Correspondingly, the damping force changing mechanism 58 can change the damping force in response to the frequency even when the piston speed is low in the same way. That is, if the reciprocating frequency of the piston 9 increases when the piston speed is low, the pressure of the chamber 11 increases in the extension stroke. Here, the free piston 87 moves toward the chamber 12 in the axial direction with respect to the housing 85 against the urging force of the O-ring 89 on the side of the chamber 12 in the axial direction while the oil liquid is introduced from the chamber 11 to the rod chamber side passage portion 123 of the in-housing passage 121 of the damping force changing mechanism 58 through the flow passage 50*a*, the in-disk passage 70, the axial passage 200, and the in-rod passage 57 in the rod side passage 122. In this way, since the free piston 87 moves toward the chamber 12 in the axial direction, the oil liquid is introduced from the chamber 11 into the in-housing passage 121 so that the flow rate of the oil liquid introduced from the chamber 11 to the flow passage 50*a*, passing through the damping force generation mechanism 51*a*, and flowing to the chamber 12 decreases. Accordingly, the damping force decreases. At that time, the amount of the oil liquid flowing into the damping force changing mechanism 58 is controlled by the throttling effect of the in-disk passage 70.

In the subsequent contraction stroke, since the pressure of the chamber 12 is high, the free piston 87 moving toward the chamber 12 in the axial direction so far moves toward the chamber 11 in the axial direction with respect to the housing 85 against the urging force of the O-ring 88 on the side of the chamber 11 in the axial direction while the oil liquid is discharged from the rod chamber side passage portion 123 of the in-housing passage 121 of the damping force changing mechanism 58 to the chamber 11 through the in-rod passage 57 of the piston rod 8, the axial passage 200, the in-disk passage 70, and the flow passage 50*a* in the rod side passage 122. In this way, when the free piston 87 moves toward the chamber 11 in the axial direction, the flow rate of the oil liquid introduced from the chamber 12 into the flow passage 50*b*, passing through the damping force generation mechanism 51*b*, and flowing to the chamber 11 decreases while the volume of the chamber 12 increases. Accordingly, the damping force decreases.

Even at that time, the amount of the oil liquid discharged from the damping force changing mechanism 58 is controlled by the throttling effect of the in-disk passage 70.

In a range in which the frequency of the piston 9 is high, the frequency of the movement of the free piston 87 also increases. As a result, the oil liquid flows from the chamber 11 to the rod chamber side passage portion 123 of the in-housing passage 121 in each extension stroke and the volume of the chamber 12 is increased by the movement of the free piston 87 in each contraction stroke. Accordingly, the damping force is maintained in a lowered state.

Meanwhile, if the frequency of the piston 9 is low when the piston speed is low, the frequency of the movement of the free piston 87 also decreases. For this reason, in the initial stage of the extension stroke, the oil liquid flows from the chamber 11 to the rod chamber side passage portion 123 of the in-housing passage 121. However, thereafter, the free piston 87 compresses the O-ring 89 and stops on the side of the chamber 12 in the axial direction with respect to the housing 85, so that the oil liquid does not flow from the chamber 11 to the rod chamber side passage portion 123 of the in-housing passage 121. For this reason, the flow rate of the oil liquid introduced from the chamber 11 into the flow passage 50*a*, passing through the damping force generation mechanism 51*a*, and flowing to the chamber 12 does not decrease and hence the damping force increases.

Also in the contraction stroke, in the initial stage, the volume of the chamber 12 is increased by the movement of the free piston 87 with respect to the housing 85. However, thereafter, the free piston 87 compresses the O-ring 88 and stops on the side of the chamber 11 in the axial direction with respect to the housing 85, so that the volume of the chamber 12 is not influenced. For this reason, the flow rate of the oil liquid introduced from the chamber 12 into the flow passage 50*b*, passing through the damping force generation mechanism 51*b*, and flowing to the chamber 11 does not decrease and hence the damping force increases.

Figure 7:
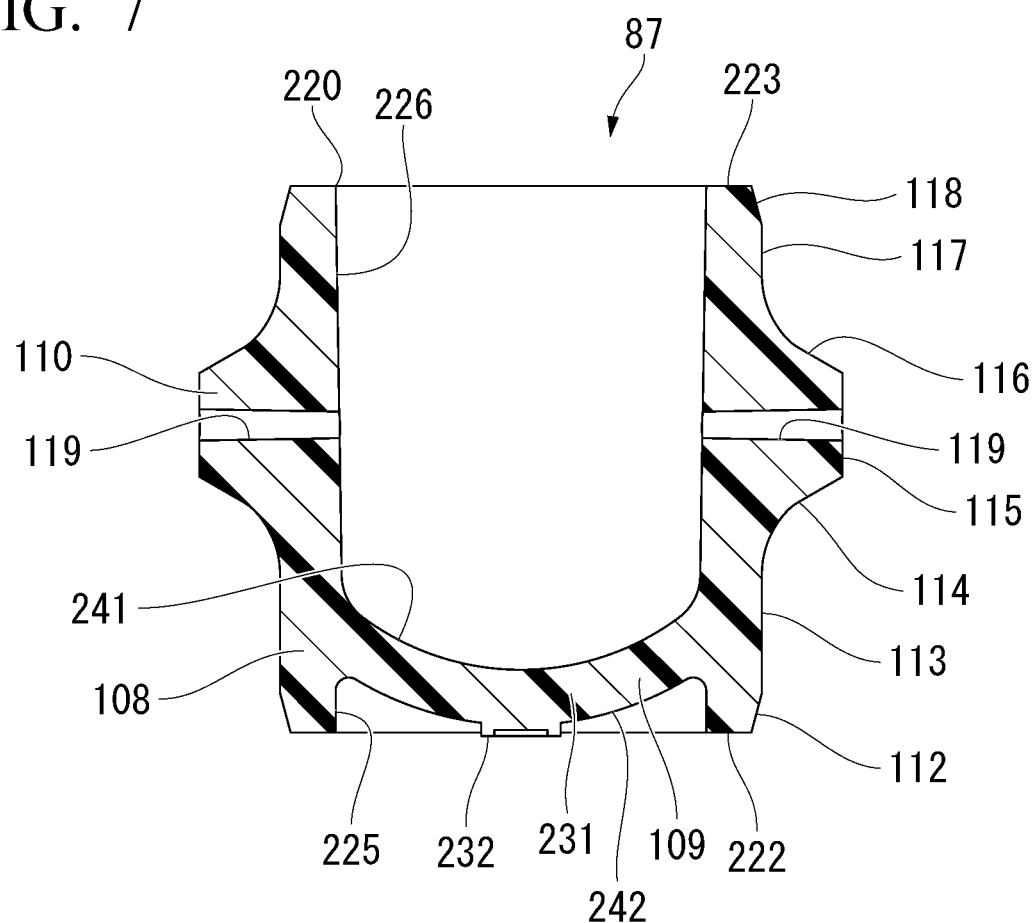
FIG. 7 is a cross-sectional view showing another type of free piston of the shock absorber according to an embodiment of the present invention.

Here, in a case in which the shock absorber 1 is manufactured, a plurality of types of free pistons each having a different axial length is prepared as the free piston 87. The axial length of the free piston 87 shown in FIG. 7 is longer than that of the free piston 87 shown in FIG. 3. Specifically, the width of the outer annular protrusion portion 110, that is, the axial length of the large diameter cylindrical surface portion 115 of the free piston 87 shown in FIG. 7 is longer than that of the free piston 87 shown in FIG. 3 and hence the axial length of the cylindrical surface portion 226 is also long. Thus, the plurality of types of free pistons 87 can be distinguished from each other by the width since the width of the outer annular protrusion portion 110 is different. The free piston 87 shown in FIG. 7 is molded by the mold 260 which includes the large diameter cylindrical surface portion formation surfaces 115A and 115B each having a longer axial length than that of the large diameter cylindrical surface portion formation surfaces 115A and 115B shown in FIG. 5 and the cylindrical surface portion formation surface 226A having an axial length longer than that of the cylindrical surface portion formation surface 226A shown in FIG. 5. When the free piston 87 is molded by dividing the mold 260 at the center in the width direction of the outer annular protrusion portion 110, it is possible to easily mold the plurality of types of free pistons 87 formed by changing the width direction of the outer annular protrusion portion 110.

When the free piston 87 having a long axial length is assembled in the damping force changing mechanism 58, the volume of the rod chamber side passage portion 123 becomes larger than a case in which the free piston 87 having a short axial length is assembled.

Here, the color of the resin material forming the plurality of types of free pistons 87 each having a different axial length is different and hence the color is different for each type. The plurality of types of free pistons 87 can be also distinguished from each other by color. Since the free piston 87 is molded by a resin material, the color can be easily different for each type by setting the color of the resin material to be different.

Then, in the method of manufacturing the shock absorber 1 according to the embodiment, as described above, the shock absorber is manufactured by assembling the free piston 87 selected from the plurality of types of free pistons 87 each including the outer annular protrusion portion 110 of a different width for each type into the housing 85. As a result, in the method of manufacturing the shock absorber 1 according to the embodiment, as described above, the shock absorber is manufactured by assembling the free piston 87 selected from the plurality of types of free pistons 87 each having a different color for each type into the housing 85.

The plurality of types of free pistons 87 can be distinguished from each other by the width of the outer annular protrusion portion 110 in a state before the free piston is assembled to the housing 85. Not only in a state before the plurality of types of free pistons 87 are assembled to the housing 85 but also in a state in which the free pistons are assembled to the housing 85 so that the outer annular protrusion portion 110 is covered with the housing 85, the piston bottom portion 109 and the piston cylindrical portion 108 on the side of the piston bottom portion 109 are exposed from the inside of the inner annular protrusion 100 of the housing body 83. Thus, the type can be distinguished by the color of the piston bottom portion 109 and the piston cylindrical portion 108 on the side of the piston bottom portion 109.

The shock absorber described in Patent Document 1 includes the damping force changing mechanism that changes the damping force characteristic in response to the vibration state. The damping force changing mechanism has a configuration in which the free piston is provided inside the housing and changes the damping force by reciprocating the free piston in response to the reciprocating frequency of the piston. Incidentally, it is required to suppress abnormal noise in the shock absorber. In a case in which the free piston of the damping force changing mechanism is manufactured, the free piston can be formed of metal such as steel.

In contrast, the shock absorber 1 according to the embodiment can be decreased in weight since the reciprocating free piston 87 of the damping force changing mechanism 58 is formed of a resin material. Thus, since the inertial force acting on the free piston decreases due to a decrease in weight, the resonance frequency of the free piston 87 can be increased. Accordingly, it is possible to suppress the occurrence of abnormal noise due to the resonance of the free piston 87. In addition, since the free piston 87 formed of or a resin material first comes into contact with the rivet 35 even when the damping force changing mechanism 58 comes into contact with the base valve 18 at the stroke end of the shock absorber 1, the generated sound can be suppressed.

Further, in the bottom portion main body 231 of the piston bottom portion 109 of the free piston 87, the bottom surface portion 241 on the side of the chamber 11 having a high pressure during the extension stroke in the chambers 11 and 12 is recessed in a curved shape and the bottom surface portion 242 on the side of the chamber 12 having a high pressure during the contraction stroke in the chambers 11 and 12 protrudes in a curved shape. Here, in the shock absorber generally used in an automobile, the extension side damping force is set to be larger than the contraction side damping force. For this reason, the pressure difference between the chambers 11 and 12 of the extension stroke is larger than that of the contraction stroke. In the bottom portion main body 231 of the piston bottom portion 109, the bottom surface portion 241 on the side of the chamber 11 having a high pressure during the extension stroke in the chambers 11 and 12 is recessed in a curved shape and the bottom surface portion 242 on the side of the chamber 12 having a low pressure on the side opposite to the chamber 11 protrudes in a curved shape. For this reason, it is possible to secure a strength and to decrease a thickness. Thus, it is possible to further decrease the weight of the free piston 87.

Further, the free piston 87 is provided with the passage hole 119 and the pressure on the side of the chamber 11 is guided between the O-ring 88 and the O-ring 89. For this reason, the pressure on the outer peripheral side of the free piston 87 is set such that the pressure on the upper side of the drawing is the pressure of the chamber 11 and the pressure on the lower side of the drawing is the pressure of the chamber 12 with respect to the O-ring 89 as a boundary. Here, the axial position of the piston bottom portion 109 of the free piston 87 is the inner periphery of the O-ring 89. For this reason, since the inner side and the outer side have substantially the same pressure on the upper side of the O-ring 89 of the free piston 87, the rigidity may be low. Further, since the piston bottom portion 109 is provided at a position in which a pressure difference between the inside and the outside occurs, the rigidity against the pressure difference between the inside and the outside is high. Accordingly, it is possible to decrease the thickness as a whole.

Further, since the free piston 87 has the residual streak 281 generated by dividing the first mold 261 and the second mold 262 of the mold 260 at the position of the outer annular protrusion portion 110 protruding from the outer peripheral side of the piston cylindrical portion 108, there is no influence on the O-rings 88 and 89 even when the residual streak 281 is not removed. Thus, manufacturing cost can be decreased.

Further, the free piston 87 includes the passage hole 119 which penetrates the piston cylindrical portion 108 at the position of the residual streak 281 generated by dividing the mold 260. For this reason, it is possible to form the passage hole 119 by the mold 260 at the time of injection-molding the free piston 87 by providing the pin 263 at the positions of the mating surfaces 271 and 275 of the first mold 261 and the second mold 262. Thus, manufacturing cost can be decreased.

Further, in the method of manufacturing the shock absorber 1 according to the embodiment, since the shock absorber 1 is manufactured by assembling the free piston 87 selected from the plurality of types of free pistons 87 each having a different color for each type into the housing 85, it is possible to distinguish the plurality of types of free pistons 87 by color. Thus, it is possible to suppress erroneous assembling of the free piston 87 into the housing 85 and to easily check whether the assembled product is appropriate after assembling.

Further, in the method of manufacturing the shock absorber 1 according to the embodiment, since the shock absorber 1 is manufactured by assembling the free piston 87 selected from the plurality of types of free pistons 87 having a different width of the outer annular protrusion portion 110 for each type into the housing 85, it is possible to distinguish the plurality of types of free pistons 87 by the width of the outer annular protrusion portion 110. Thus, it is possible to suppress erroneous assembling of the free piston 87 into the housing 85.

A shock absorber of a first aspect of the above-described embodiment includes: a cylinder which is filled with a working fluid; a piston which is slidably fitted into the cylinder and divides the inside of the cylinder into two chambers of one side chamber and the other side chamber; a piston rod which is connected to the piston and extends to the outside of the cylinder; a first passage through which the working fluid flows from the one side chamber inside the cylinder when the piston moves in one direction; a second passage which communicates with one side chamber of the two chambers; a damping force generation mechanism which is provided in the first passage and generates a damping force; a communication hole which is provided with at least a part of a passage of the second passage and is formed in the piston rod communicating with at least one side chamber; a housing which has a passage of at least a part of the second passage formed therein; a bottomed cylindrical free piston which is movably provided inside the housing, defines the second passage into an upstream side and a downstream side of a flow of the working fluid when the piston moves in one direction, and includes a cylindrical portion and a bottom portion; and an elastic body which is provided between the free piston and the housing. In the shock absorber of the aspect, the free piston is formed of a resin material.

Further, according to a second aspect, in the first aspect, in the bottom portion of the free piston, a first bottom surface portion on the side of one side chamber having a high pressure during an extension stroke is recessed in a curved shape and a second bottom surface portion on the side of the other side chamber having a high pressure during a contraction stroke protrudes in a curved shape.

Further, according to a third aspect, in the first or second aspect, the free piston has a cylindrical shape in which an annular convex portion is formed on an outer periphery of the free piston and the bottom portion is formed inside the free piston on the side of the other side chamber having a higher pressure than the annular convex portion during the contraction stroke in the axial direction, the annular elastic bodies are provided on both sides in the axial direction of the annular convex portion on the outer periphery of the free piston, and the free piston is provided with a through-hole for communicating a gap between the annular elastic bodies with one side chamber having a high pressure during the extension stroke inside the free piston.

Further, according to a fourth aspect, in the first or second aspect, the free piston includes a protrusion portion which protrudes from an outer peripheral side of the cylindrical portion and in which the elastic body is provided between the protrusion portion and the housing and a residual streak generated by dividing a mold is formed at the position of the protrusion portion.

Further, according to a fifth aspect, in the fourth aspect, a through-hole which penetrates the cylindrical portion is formed at the position of the residual streak in the free piston.

Further, a sixth aspect is a method of manufacturing the shock absorber of the fourth or fifth aspect, wherein the shock absorber is manufactured by assembling a free piston selected from a plurality of types of free pistons with the protrusion portions each having a different width for each type into the housing.

Further, a seventh aspect is a method of manufacturing the shock absorber of any one of the first to sixth aspects, wherein the shock absorber is manufactured by assembling a free piston selected from a plurality of types of free pistons with the protrusion portions each having a different color for each type into the housing.

INDUSTRIAL APPLICABILITY

According to the shock absorber, the generation of abnormal noise can be suppressed.

REFERENCE SIGNS LIST

1 Shock absorber
4 Cylinder
8 Piston rod
9 Piston
11 Chamber (one side chamber)
12 Chamber (other chamber)
50a Flow passage (part of first and second passages)
51a Damping force generation mechanism
55, 56 Communication hole
85 Housing
87 Free piston
88, 89 O-ring (elastic body)
108 Piston cylindrical portion (cylindrical portion)
109 Piston bottom portion (bottom portion)
110 Outer annular protrusion portion (protrusion portion)
119 Passage hole (through-hole)
122 Rod side passage (second passage)
241 Bottom surface portion (first bottom surface portion)
242 Bottom surface portion (second bottom surface portion)
281 Residual streak

The invention claimed is:

1. A shock absorber comprising:
a cylinder which is filled with a working fluid;
a piston which is slidably fitted into the cylinder and divides the inside of the cylinder into two chambers including a first chamber and a second chamber;
a piston rod which is connected to the piston and extends to the outside of the cylinder;
a first passage through which the working fluid flows from one of the first or second chambers inside the cylinder when the piston moves in one direction;
a second passage which communicates with one of the first or second chambers;
a damping force generation mechanism which is provided in the first passage and generates a damping force;
a communication hole which is provided with at least a part of a passage of the second passage and is formed in the piston rod communicating with the first chamber;
a housing which has a passage of at least a part of the second passage formed therein;
a bottomed cylindrical free piston which is movably provided inside the housing, defines the second passage into an upstream side and a downstream side of a flow of the working fluid when the piston moves in the one direction, and includes a cylindrical portion and a bottom portion; and
an elastic body which is provided between the free piston and the housing,
wherein the free piston is formed of a resin material,
wherein in the bottom portion of the free piston, a cross section of a first bottom surface portion on a side of the first chamber having a high pressure during an extension stroke is recessed in an arc shape and a cross section of a second bottom surface portion on a side of the second chamber having a high pressure by receiving the working fluid during a contraction stroke protrudes in an arc shape, wherein the free piston includes a protrusion portion which protrudes, at an intermediate position in an axial direction of the cylindrical portion, from an outer peripheral side of the cylindrical portion and wherein the elastic body is provided between the protrusion portion and the housing, wherein a residual streak generated by dividing a mold is formed at a position of the protrusion portion, wherein the cylinder includes a rivet fixed at a bottom of the inside of the cylinder, and wherein the free piston includes a protrusion which is formed on the second bottom surface portion and protrudes toward the rivet.

2. The shock absorber according to claim 1,
wherein the free piston has a cylindrical shape in which an annular convex portion is formed on an outer periphery of the free piston and the bottom portion is formed inside the free piston on the side of the second chamber having a higher pressure than the annular convex portion during the contraction stroke in the axial direction, wherein the elastic body has annular elastic members provided on both sides in the axial direction of the annular convex portion on the outer periphery of the free piston, and wherein the free piston is provided with a through-hole for communicating a gap between the annular elastic members with the first chamber having a high pressure during the extension stroke inside the free piston.

3. The shock absorber according to claim 1,
wherein a through-hole which penetrates the cylindrical portion is formed at the position of the residual streak in the free piston.

4. A method of manufacturing the shock absorber, wherein the shock absorber comprises:
a cylinder which is filled with a working fluid;
a piston which is slidably fitted into the cylinder and divides the inside of the cylinder into two chambers including a first chamber and a second chamber;
a piston rod which is connected to the piston and extends to the outside of the cylinder;
a first passage through which the working fluid flows from one of the first or second chambers inside the cylinder when the piston moves in one direction;
a second passage which communicates with one of the first or second chambers;
a damping force generation mechanism which is provided in the first passage and generates a damping force;
a communication hole which is provided with at least a part of a passage of the second passage and is formed in the piston rod communicating with the first chamber;
a housing which has a passage of at least a part of the second passage formed therein;
a bottomed cylindrical free piston which is movably provided inside the housing, defines the second passage into an upstream side and a downstream side of a flow of the working fluid when the piston moves in the one direction, and includes a cylindrical portion and a bottom portion; and
an elastic body which is provided between the free piston and the housing,
wherein the free piston is formed of a resin material,
wherein in the bottom portion of the free piston, a cross section of a first bottom surface portion on a side of the first chamber having a high pressure during an extension stroke is recessed in an arc shape and a cross section of a second bottom surface portion on a side of the second chamber having a high pressure by receiving the working fluid during a contraction stroke protrudes in an arc shape, wherein the free piston includes a protrusion portion which protrudes, at an intermediate position in an axial direction of the cylindrical portion, from an outer peripheral side of the cylindrical portion and wherein the elastic body is provided between the protrusion portion and the housing, wherein a residual streak generated by dividing a mold is formed at the position of the protrusion portion, wherein the cylinder includes a rivet fixed at a bottom of the inside of the cylinder, and wherein the free piston includes a protrusion which is formed on the second bottom surface portion and protrudes toward the rivet, the method comprising the steps of:
selecting the free piston that is used for the manufacturing from a plurality of types of free pistons with the protrusion portions each having a different width for each type; and
assembling the selected free piston into the housing.

5. A method of manufacturing the shock absorber, wherein the shock absorber comprises:
a cylinder which is filled with a working fluid;
a piston which is slidably fitted into the cylinder and divides the inside of the cylinder into two chambers including a first chamber and a second chamber;
a piston rod which is connected to the piston and extends to the outside of the cylinder;
a first passage through which the working fluid flows from one of the first or second chambers inside the cylinder when the piston moves in one direction;
a second passage which communicates with one of the first or second chambers;
a damping force generation mechanism which is provided in the first passage and generates a damping force;
a communication hole which is provided with at least a part of a passage of the second passage and is formed in the piston rod communicating with the first chamber;
a housing which has a passage of at least a part of the second passage formed therein;
a bottomed cylindrical free piston which is movably provided inside the housing, defines the second passage into an upstream side and a downstream side of a flow of the working fluid when the piston moves in the one direction, and includes a cylindrical portion and a bottom portion; and
an elastic body which is provided between the free piston and the housing,
wherein the free piston is formed of a resin material,
wherein in the bottom portion of the free piston, a cross section of a first bottom surface portion on a side of the first chamber having a high pressure during an extension stroke is recessed in an arc shape and a cross section of a second bottom surface portion on a side of the second chamber having a high pressure by receiving the working fluid during a contraction stroke protrudes in an arc shape, wherein the free piston includes a protrusion portion which protrudes, at an intermediate position in an axial direction of the cylindrical portion, from an outer peripheral side of the cylindrical portion and wherein the elastic body is provided between the protrusion portion and the housing, and wherein a residual streak generated by dividing a mold is formed at a position of the protrusion portion, wherein the cylinder includes a rivet fixed at a bottom of the inside of the cylinder, and wherein the free piston includes a protrusion which is formed on the second bottom surface portion and protrudes toward the rivet, the method comprising the steps of:

selecting the free piston that is used for the manufacturing from a plurality of types of free pistons each having a different color for each type; and assembling the selected free piston into the housing.

* * * * *